(12) United States Patent
Lee et al.

(10) Patent No.: US 9,602,883 B2
(45) Date of Patent: Mar. 21, 2017

(54) METHOD FOR TRANSMITTING/RECEIVING MEDIA AND DEVICE FOR TRANSMITTING/RECEIVING USING SAME

(75) Inventors: Hyeonjae Lee, Seoul (KR); Waqar Zia, Munich (DE)

(73) Assignee: LG ELECTRONICS INC., Seoul (KR)

( * ) Notice: Subject to any disclaimer, the term of this patent is extended or adjusted under 35 U.S.C. 154(b) by 575 days.

(21) Appl. No.: 13/811,024

(22) PCT Filed: Jul. 19, 2011

(86) PCT No.: PCT/KR2011/005305
§ 371 (c)(1),
(2), (4) Date: Jan. 18, 2013

(87) PCT Pub. No.: WO2013/011722
PCT Pub. Date: Jan. 26, 2012

(65) Prior Publication Data
US 2013/0125186 A1    May 16, 2013

Related U.S. Application Data

(60) Provisional application No. 61/365,372, filed on Jul. 19, 2010.

(51) Int. Cl.
*H04N 21/643* (2011.01)
*H04L 29/06* (2006.01)
(Continued)

(52) U.S. Cl.
CPC ..... *H04N 21/64322* (2013.01); *H04L 65/602* (2013.01); *H04L 65/607* (2013.01);
(Continued)

(58) Field of Classification Search
None
See application file for complete search history.

(56) References Cited

U.S. PATENT DOCUMENTS 5,703,887 A * 12/1997 Heegard ............... H03M 13/33
375/E7.02
7,349,386 B1 * 3/2008 Gou ................... H04L 29/06027
370/356

(Continued)

FOREIGN PATENT DOCUMENTS

KR    10-2008-0072019 A    8/2008
KR    10-2010-0028546 A    3/2010

*Primary Examiner* — Noel Beharry
*Assistant Examiner* — Wilfred Thomas
(74) *Attorney, Agent, or Firm* — Dentons US LLP

(57) ABSTRACT

Methods and apparatuses for transmitting/receiving a media transport stream by using an internet protocol (IP) based transport system are provided. The transmitting method includes removing some data from media transport stream to be transmitted; configuring at least one entry box including information for reinserting the removed data into the media transport stream; configuring a media data (mdat) box including the media transport stream from which the data has been removed; and positioning and transporting a compression information box including the at least one entry box before the mdat box.

16 Claims, 19 Drawing Sheets

(51) Int. Cl.
*H04N 21/236* (2011.01)
*H04N 21/854* (2011.01)

(52) U.S. Cl.
CPC . *H04N 21/23608* (2013.01); *H04N 21/23611* (2013.01); *H04N 21/85406* (2013.01)

(56) References Cited

U.S. PATENT DOCUMENTS

| | | | |
|---|---|---|---|
| 7,505,480 B1* | 3/2009 | Zhang | H04N 21/23614 370/235 |
| 7,589,648 B1* | 9/2009 | Ma | H03M 7/3086 326/37 |
| 2007/0074267 A1* | 3/2007 | Clerget | H04H 60/07 725/136 |
| 2008/0092181 A1* | 4/2008 | Britt | 725/87 |
| 2009/0028079 A1* | 1/2009 | Song et al. | 370/310 |
| 2009/0028081 A1* | 1/2009 | Song et al. | 370/310 |
| 2009/0055417 A1 | 2/2009 | Hannuksela | |
| 2010/0172374 A1* | 7/2010 | Lemonnier | H04L 29/06027 370/473 |
| 2011/0035772 A1* | 2/2011 | Ramsdell et al. | 725/36 |
| 2011/0129087 A1* | 6/2011 | Zhang | G06F 21/10 380/44 |

* cited by examiner

FIG.6

Box Type: 'cinf'
Container: Segment
Mandatory: No
Quantity: One or more

FIG.7

```
aligned(8) class CompressionInformationBox extends Box('cinf') {
}
```

FIG.8

Box Type: 'comb'
Container: Compression Information Box('cinf')
Mandatory: Yes
Quantity: One or more

FIG.9

```
aligned(8) class CompressionEntryBox extends FullBox('comb', version, flags)
{
        unsigned int(8)     reinsert_data;
        unsigned int(32)    entry_count;

for (i=0; i < entry_count; i++) { if(eight-bit-offset) {
                unsigned int(8)     diff_offset;
            }elseif(sixteen-bit-offset) {
                unsigned int(16)    diff_offset;
            }else{
                unsigned int(32)    diff_offset;
            } unsigned int(8)     string_length;
        }

Box Type: 'npsb'
Container: Compression Information Box('cinf')
Mandatory: No
Quantity: One

FIG.11

```
aligned(8) class NullPacketSignalBox extends FullBox('npsb', version, flags)
{
        // the following field is optional
        unsigned int(8)      packet_offset;
        unsigned int(32)     entry_count;

for (i=0; i < entry_count; i++) {
            unsigned int(1)     null_packet;
        } for (i=0; i < entry_count%8; i++) {
            unsigned int(1)     pad = 0;
        }
}
```

| styp | cinf | 1 or more comb | npsb | mdat | MPEG-2 TS data |

… # METHOD FOR TRANSMITTING/RECEIVING MEDIA AND DEVICE FOR TRANSMITTING/RECEIVING USING SAME

CROSS-REFERENCE TO RELATED APPLICATIONS

This application is a 35 USC §371 National Stage entry of International Application No. PCT/KR2011/005305 filed on Jul. 19, 2011, and claims priority of U.S. Provisional Application No. 61/365,372 filed on Jul. 19, 2010, all of which are incorporated by reference in their entirety herein.

BACKGROUND

The present disclosure relates to methods and apparatuses for transmitting/receiving media transport streams by using an internet protocol (IP) based transport system.

Currently, most of digital broadcasting systems such as terrestrial, cable, or digital multimedia broadcasting systems are streaming AV contents by using an MPEG-2 transport stream (TS).

In addition, as the internet recently grows rapidly, multimedia services that provide contents by using an internet protocol (IP) network as a main transport network are being activated. Digital broadcasting is developing to an aspect requiring more traffic, such as stereo 3D video, ultra high definition (UHD), multi-viewpoint 3D video, and hologram broadcasting.

However, it may not be efficient for an MPEG-2 TS with a packet with a fixed length of 188 bytes to transport contents with higher resolution than those of a typical HDTV by using the IP network.

SUMMARY

Embodiments provide methods and apparatuses capable of efficiently transmitting/receiving media transport streams such as an MPEG-2 TS in an IP based transport system.

Embodiments also provide a method and apparatus capable of efficiently storing a media transport stream such as an MPEG-2 TS.

In one embodiment, A method of transmitting media transport streams by using an IP based transport system includes removing some data from media transport streams to be transmitted; forming at least one entry box including information for reinserting the removed data into the media transport streams; forming a media data (mdat) box including the media transport streams from which the data has been removed; and positioning and transporting a compression information box including the at least one entry box before the mdat box.

In another embodiment, a method of receiving media transport streams by using an IP based transport system, the method includes sequentially receiving a compression information box that includes at least one entry box and an mdat box that includes media transport streams from which some data are removed; acquiring information for reinserting the removed data from the entry box; and reinserting the removed data into the media transport streams that is included in the mdat box, by using the acquired information.

In further another embodiment, an apparatus for transmitting media transport streams by using an IP based transport system includes a control unit removing some data from media transport streams to be transmitted and forming a compression information box that includes at least one entry box and a media data (mdat) box that includes media transport streams from which the data is removed; and a network interface unit positioning and transporting the compression information box before the mdat box, and wherein the entry box includes information for reinserting the removed data into the media transport streams.

In still further another embodiment, an apparatus for receiving media transport streams by using an IP based transport system includes a network interface unit sequentially receiving a compression information box that includes at least one entry box and a media data (mdat) box that includes media transport streams from which some data is removed; and a control unit acquiring information for reinserting the removed data, from the entry box and reinserting the removed data into media transport streams included in the mdat box, by using the acquired information.

BRIEF DESCRIPTION OF THE DRAWINGS

FIG. 6 is a view representing the definition of a compression information (cinf) box illustrated in FIG. 5.

FIG. 7 is syntax representing an embodiment of a configuration of the compression information (cinf) box.

FIG. 8 is a view representing the definition of the compression entry box (comb) illustrated in FIG. 5.

FIG. 9 is syntax representing an embodiment of a configuration of the compression entry box (comb).

FIG. 10 is a view representing the definition of the num packet signal box (npsb) illustrated in FIG. 5.

FIG. 11 is syntax representing an embodiment of a configuration of the compression information and null packet signal box (npsb).

FIG. 13 is a view representing an embodiment of a configuration of a media data stream transmitted from a transmitting apparatus.

DETAILED DESCRIPTION OF THE EMBODIMENTS

Methods of transmitting/receiving media and transmitting/receiving apparatuses using these methods according to embodiments will be described in detail below with reference to FIGS. 1 to 19.

Detailed descriptions related to well-known functions or configurations will be ruled out in order not to unnecessarily obscure subject matters of the present invention. The terms described below are those defined by considering the functions in embodiments of the present invention and may vary depending on the intention or of a user or an operator or practice. Therefore, the definitions will be made on the basis of the contents throughout the specification.

Figure 1:
FIG. 1 is a view representing a configuration of an IP based media transmitting/receiving system according to an embodiment of the present invention.

FIG. 1 illustrates a configuration of an IP based media transmitting/receiving system according to an embodiment of the present invention as a block diagram, and the illustrated transmitting/receiving system may include a transmitting apparatus 100 and a receiving apparatus 200.

Referring to FIG. 1, the transmitting apparatus 100 and receiving apparatus 200 transmits/receives data by using an internet protocol (IP) based transport system, and the data may be streamed by using for example, transmission control protocol (TCP) and hypertext transfer protocol (HTTP) through a web server.

The transmitting apparatus 100 may receive, convert, and transport contents from a content provider or may store and keep them in a media database.

For example, the media transport stream provided from the content provider may be one according to MPEG-2 standard, namely, an MPEG-2 transport stream (MPEG-2 TS) that is widely employed in various applications. The receiving device 100 may convert the MPEG-2 TS into a format suitable for IP based delivery and transport it through a network such as internet or may store it in the media DB.

Meanwhile, the receiving apparatus 200 may receive the media transport stream from the transmitting apparatus 100 by using the IP based transport system, convert the received media transport stream, and then replay or store it in a local storage.

For example, the receiving apparatus 200 may convert and process the media transport stream received from the transmitting apparatus 100 into an MPEG-2 TS format, and replay or store it into the local storage.

The MPEG-2 TS is targeted at lossy storage and transport systems such as digital video broadcasting environments including digital video broadcasting (DVB) or advanced television system committee (ATSC). The MPEG-2 TS based media is widely used and its encoding and decoding engines are being usefully used in digital video broadcasting environments.

Meanwhile, a media encapsulation format such as the MPEG-2 TS may also be used for other systems that use IP based transport, and may include hybrid deployment of components over the internet and components in local broadcasting environments in which services may be provided through multiple connections.

As the MPEG-2 TS in the encapsulation format is widely used and the IP based transport system is widely used as described above, their hybrid use may be very effective. For example, the media transport stream in the MPEG-2 TS format may be streamed by using HTTP.

However, the type and properties of a transport mechanism for IP based new target applications are very different from those of target transport mechanisms in the MPEG-2 TS standard, and thus new compatibility and optimization matters may occur.

According to an embodiment of the present invention, if being used in a target system such as the IP based transport system (for example, HTTP based streaming), a media transport efficiency may be enhanced by removing the redundancy of MPEG-2 TS based media.

To that end, the transmitting apparatus 100 may prepare contents for HTTP streaming by performing segmentation and compression for removing the redundancy on the MPEG-2 TS based media.

Meanwhile, the compressed data may be stored in the storage of the transmitting apparatus 100 or be transmitted to the receiving apparatus 200 through the HTTP based transport system.

In addition, the receiving apparatus 200 may decompress and recombine the segments transported through the HTTP streaming to restore the MPEG-2 TS.

Figure 2:
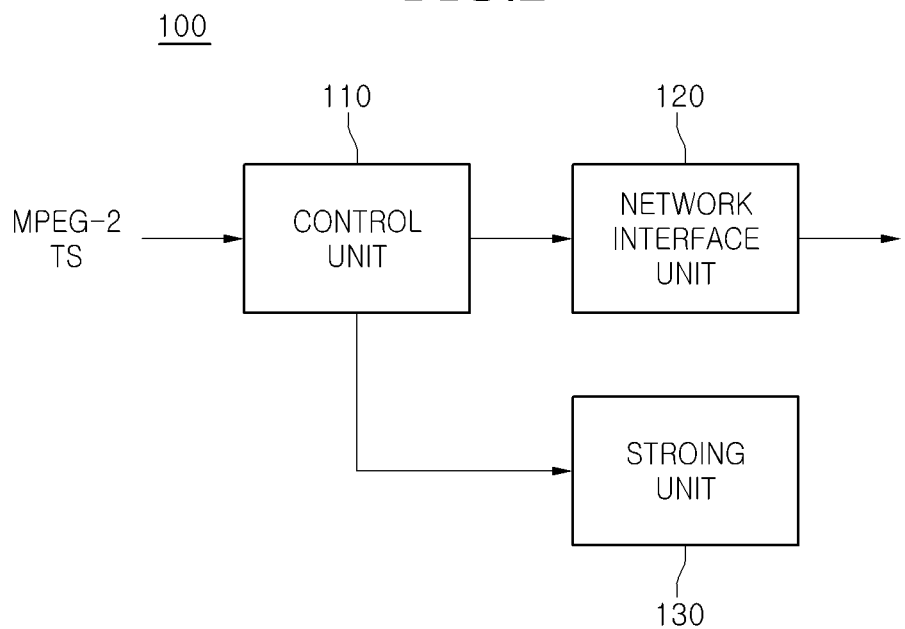
FIG. 2 is a block diagram representing a configuration of a transmitting apparatus according to an embodiment of the present invention.

FIG. 2 illustrates a configuration of a transmitting apparatus according to an embodiment of the present invention as a block diagram, and the illustrated transmitting apparatus 100 may include a control unit 110, a network interface unit 120, and a storing unit 130.

Referring to FIG. 2, the control unit 110 may remove some data from input MPEG-2 media transport streams and create information on the removed data.

The MPEG-2 TS is defined to use for lossy systems and has a fixed packet size of 188 bytes to satisfy the requirements of an asynchronous transfer mode (ATM) network. Its timing and buffering model mainly focus on a channel at a fixed bit rate.

On the other hand, an IP based transport system according to an embodiment of the present invention may use reliable transport protocol with variable bandwidth conditions, such as an HTTP based streaming application.

In the HTTP based streaming application, media data such as MPEG-2 TS may be transported by using HTTP/TCP in the type of segments or segment byte ranges.

Meanwhile, if the receiving apparatus 200 working as a client wants to start randomly replaying a media sample, a first proper segment or byte range may be fetched by using HTTP streaming protocol.

Subsequently, the sample may be positioned and the timing of the sample may be restored to replay the samples contiguous to a target sample. In addition, if there is a need for continuous replay, new continuous segments may be fetched simultaneously with decoding.

In terms of technology, a transport streaming format such as the MPEG-2 TS may not be suitable for the reliable and various bit rate mechanisms of the HTTP based transport as described above.

According to an embodiment of the present invention, in the IP based transport system (for example, HTTP streaming), the transmitting apparatus 110 may remove unnecessary redundancy data from transport streams to be transmitted in order to decrease unnecessary overhead present in a transport stream such as an MPEG-2 TS.

For example, the unnecessary data removed from the MPEG-2 TS is syntax-based redundancy and may be a specific syntax element included in the header of MPEG-2 TS, a stuffing byte, or a null packet.

Meanwhile, the transmitting apparatus 100 may form information on the data removed from the MPEG-2 TS described above as at least one box, and the box may have a form according to an ISO/IEC 14496-12 ISO base media file format.

For example, the control unit 110 of the transmitting apparatus 100 configures a compression information box including at least one entry box, and the entry box may include information for reinserting the data removed from the MEGP-2 TS into the MPEG2-2 TS at the receiving apparatus 200.

In addition, the control unit 110 may configure a media data (mdat) box including the MPEG-2 TS from which the data has been removed.

Meanwhile, media data may be transmitted through the network interface unit 120, the media data including a compression information box including information for reinserting the removed data and an mdat box including the MPEG-2 TS from which the data has been removed.

In this case, the MPEG-2 TS from which the data has been removed may be included in the mdat box segment by segment, and the compression information box may be positioned before the mdat box and transported to the receiving apparatus 200 through an IP based transport system.

Embodiments of a method of transmitting media according to the present invention will be described in more detail below with reference to FIGS. 3 to 13.

Figure 3:
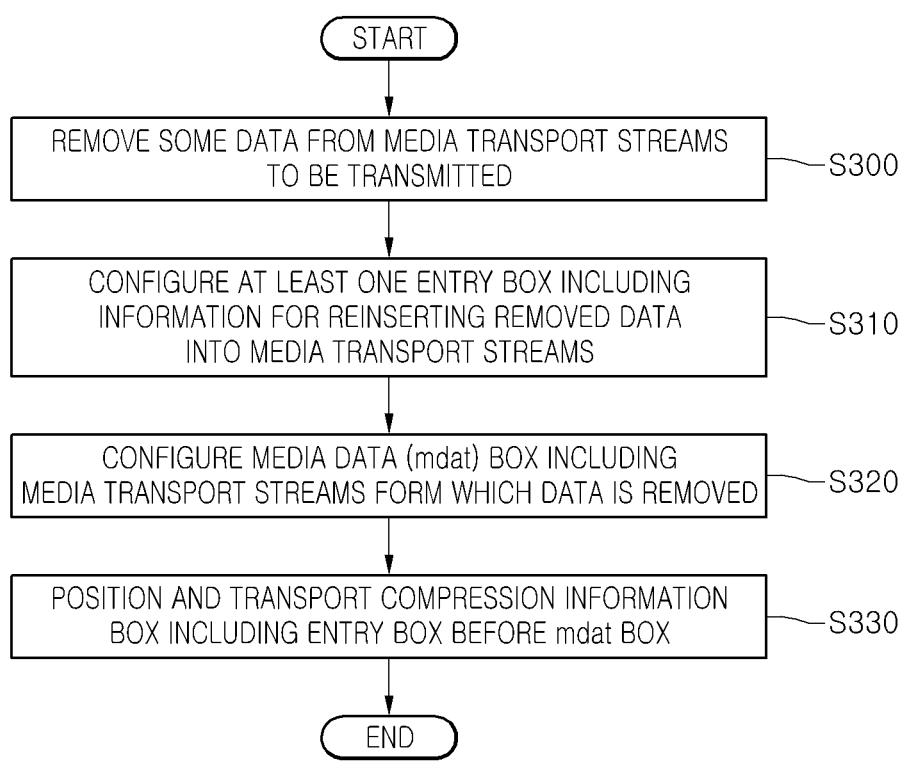
FIG. 3 is a flow chart representing a media transmitting method according to an embodiment of the present invention.

FIG. 3 illustrates a method of transmitting media according to an embodiment of the present invention as a flow chart, and the illustrated transmitting method will be described in connection with a block diagram representing a configuration of a transmitting apparatus according to an embodiment of the present invention illustrated in FIG. 2.

Referring to FIG. 3, the control unit 110 of the transmitting apparatus 100 removes some data from a media transport stream to be transmitted in step S300.

For example, the control unit 110 may remove unnecessary redundancy data from input MPEG-2 TS.

Figure 4:
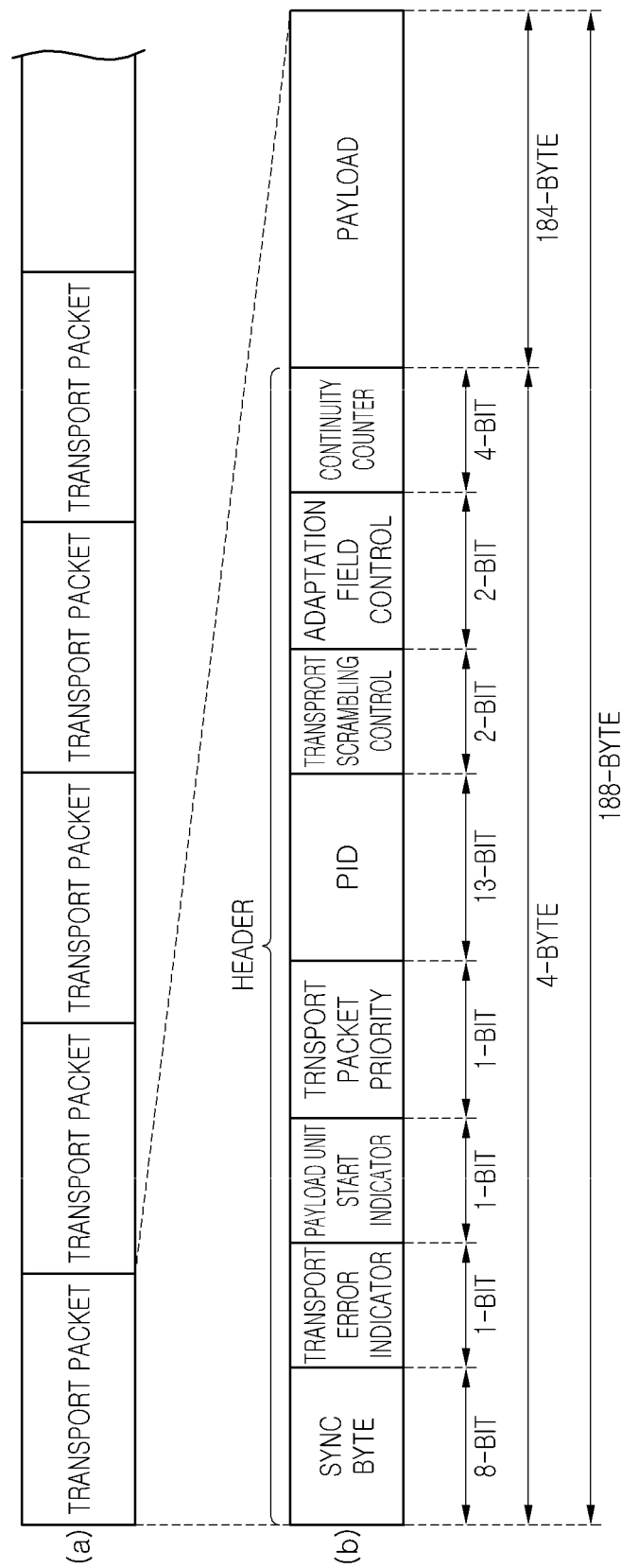
FIG. 4 is a view representing an embodiment of a configuration of a media transport stream.

Referring to a configuration of the MPEG-2 TS illustrated in FIG. 4, a transport packet includes 4-byte header and 184-byte payload following the header and thus has a size of 188 bytes regardless of intended transport mechanisms.

Meanwhile, the header may include an 8-bit sync byte, an 1-bit transport error indicator, an 1-bit payload unit start indicator, an 1-bit transport packet priority, a 13-bit packet identification (PID), 2-bit transport scrambling control, 2-bit adaptation field control (AFC), and a 4-bit continuity counter.

The size of the packet is considerably smaller than those of data units transported from the general use scenario of HTTP streaming and this occurs considerable redundancy together with the fact that several syntax elements in the header described above focus on transporting through the lossy system of an MPEG-2 TS.

For example, the syntax elements of the header, such as the sync byte, transport error indicator, and continuity counter may be unnecessary data in an IP based transport system such as HTTP streaming.

More particularly, at a high packetization rate of 188 bytes per packet, one unnecessary byte such as the sync byte may occur unnecessary overhead of above approximately 0.5%.

Meanwhile, by the packetization mechanism of an MPEG-2 TS with a fixed size of 188 bytes per packet described above, byte stuffing may be used.

For example, if a program specific information (PSI) transport stream packet is partially filled or a program elementary stream packet partially fills a TS packet, the unnecessary stuffing bytes described above may be included in the MPEG-2 TS.

That is, in order to satisfy a fixed bit rate of 188 bytes per packet, bytes with a value of 0xFF may be repetitively inserted into the payload of the MPEG-2 TS, and the stuffing byte may thus occur redundancy in HTTP streaming.

In addition, in order to achieve a fixed bandwidth or a desired multiplexing ratio, unnecessary null packets may be inserted into the MPEG-2 TS. In this case, a decoder removes null packets as described above and then performs decoding.

For example, if the PID included in the header is 0x1FFF, it may represent that a corresponding packet is a null packet, and the payload of the null packet may be entirely filled with 0 or 0xFF bytes.

According to an embodiment of the present invention, the control unit 110 of the transmitting apparatus 100 may remove unnecessary data described above, such as the sync byte of header, stuffing bytes or null packets, from the MPEG-2 TS and thus remove syntax based redundancy.

However, the specific syntax elements included in the header of the MPEG-2 TS, stuffing bytes, and null packets are just examples of an embodiment of the present invention. The present invention is not limited thereto but the transmitting apparatus 100 may remove data unnecessary for an IP based transport system from the MPEG-2 TS, besides the data described above.

For example, subtitle tracks including considerable redundancy or several types of payload data such as an electronic program guide may be directly multiplexed into the transport stream, and the sub-optimal compression of video and audio data may also contribute to adding redundancy.

Subsequently, the control unit 110 forms at least one entry box including information necessary for reinserting the removed data into the media transport stream in step S310.

For example, the control unit 110 may configure information as an entry box, the information signaling so that the receiving apparatus 200 working as a client may reinsert the data removed in step S300 into the transport stream. The entry box may be included in a compression information box.

In step S320, the control unit 110 forms an mdat box including a media transport stream from which the data has been removed. The network interface unit 120 positions and transports the compression information box including at least one entry box before the mdat box in step S330.

For example, the control unit 110 may encapsulate the MPEG-2 TS from which unnecessary data has been removed in step S300, into an mdat box according to an ISO/IEC 14496-12 ISO base media file format.

Figure 5:
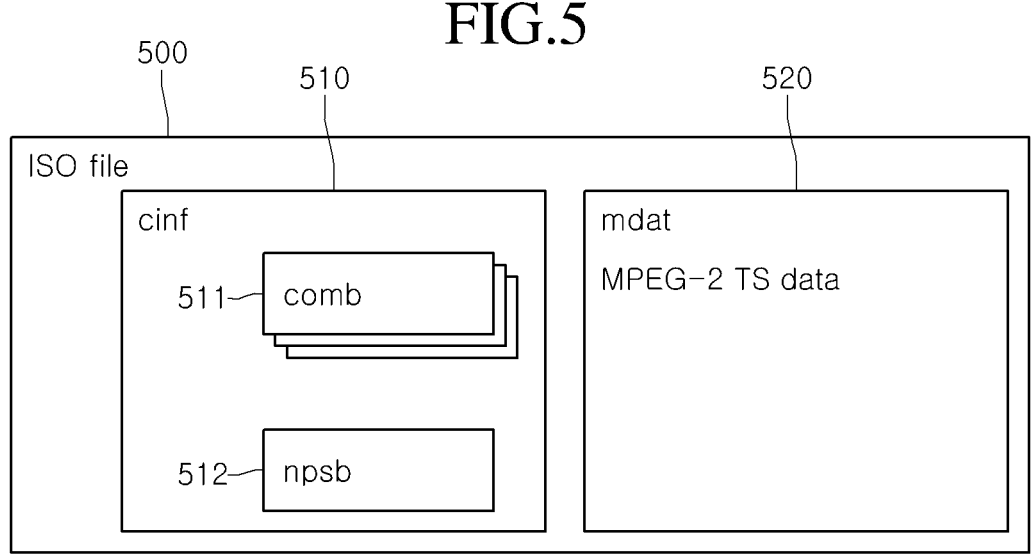
FIG. 5 is a view representing a media data format according to an embodiment of the present invention.

FIG. 5 illustrates an embodiment of a configuration of a media data format according to an embodiment of the present invention.

Referring to FIG. 5, media data 500 includes a compression information (cinf) box and an mdat box, and the compression information (cinf) box may include one or more compression entry boxes (combs) that include information for reinserting the data removed from the transport stream.

In addition, an MPEG-2 TS from which the unnecessary data described above, such as the sync byte of header, stuffing bytes or null packets has been removed may be included in the mdat box segment by segment.

Meanwhile, as illustrated in FIG. 5, the compression information (cinf) box may further a null packet signal box (npsb) that provides signaling for reinserting the removed null packet.

Signaling a client side, namely the receiving apparatus 200 for reinserting the removed data as described above may be carried out by box data types illustrated in FIGS. 6 to 11, and a remainder operator symbolized as '%' may be used in syntax.

Referring to FIGS. 6 and 7, the compression information (cinf) box may include one or more compression entries, each of which may include information necessary for reinserting the data removed from the MPEG-2 TS into the receiving apparatus 100.

Referring to FIG. 8, the compression entry box (comb) may provide information that signals the receiving apparatus 200 a method of reinserting the removed data into the correct position of media data to restore original data at a syntax level.

Meanwhile, the compression entry box (comb) is included in the compression information (cinf) box as illustrated in FIGS. 6 and 7, and one or more compression entry boxes may be present in the compression information (cinf) box.

FIG. 9 is syntax representing an embodiment of a configuration of the compression entry box (comb).

Referring to FIG. 9, the version is an integer representing the version of a corresponding box and may have a value of '0' or '1'.

Meanwhile, flags are 24-bit integers with flags and may be defined as the following values.

'sync-byte-removed' represents that the sync byte of a header that is a syntax element of an MPEG-2 TS has been removed, and its flag value may have '0x000001'.

Meanwhile, the sync-byte-removed has the same value in all the compression entry boxes (comb) that have been included in one compression information (cinf) box.

'reinsert_data' represents repeated data, namely a string to be reinserted at the receiving apparatus 200, and 'string_length' represents may represent how many times the reinsert_data is repeated to reinsert the string.

Meanwhile, the reinsert_data may be designated in the following repeated loop so that each entry has different value.

'diff_offset' provides information on a position into which the repeated byte string will be reinserted and to that end, may represent the differential byte offset of the position to be reinserted.

For example, the diff_offset may represent the differential byte offset from the last byte of a previously inserted string to the inserted byte string.

Meanwhile, in the case of the byte string reinserted for the first time, the diff_offset may represent the offset from the first byte of corresponding media data to a corresponding byte string.

'eight-bit-offset' represents that the diff_byte is expressed as an 8-bit data type, and may have a flag value of 0x000002.

In addition, 'sixteen-bit-offset' represents that the diff_byte is expressed as a 16-bit data type, and may have a flag value of 0x000004.

Meanwhile, 'entry_count' may represent the umber of entries that are present in the following loop.

If a byte such as a stuffing byte that is repeated with a specific value is removed, the compression entry box (comb) as described above with reference to FIGS. 8 and 9 may provide information for reinserting the removed byte.

Referring to FIG. 10, the null packet signal box (npsb) may provide information for signaling the receiving apparatus 200 working as a client a method of reinserting the removed null packet into the correct position of media data and restoring original data at a syntax level.

Meanwhile, the null packet signal box (npsb) is included in the compression information (cinf) box illustrated in FIGS. 6 and 7, and one null packet signal box may be present in the compression information (cinf) box.

FIG. 11 is syntax representing an embodiment of a configuration of the null packet signal box (npsb).

Referring to FIG. 11, a version is an integer representing the version of a corresponding box and may have a value of '0' or '1'.

Meanwhile, flags are 24-bit integers with flags and may be defined as the following values.

'packet_offset' may represent the offset of the first transport stream (TS) packet from the start of an associated media entity.

In addition, 'packet_offset_flag' represents whether the packet_offset is present, and its flag value may be 0x000001.

'null_packet' represents whether a corresponding transport packet is a null packet. If its field value is '0', the transport packet is not a null packet, and if its field value is '1', the transport packet is a null packet.

For example, the null packet signal box (npsb) includes a plurality of entries that correspond to each of a plurality of transport packets in an MPEG-2 TS to be restored, and the plurality of entries each may include the null_packet field that represents whether a transport packet corresponding to a corresponding entry is a null packet.

If the value of the null_packet field is '0', there is no need for the receiving apparatus 200, a client side to perform an operation of reinserting a null packet because a corresponding media packet is not a null packet in media.

On the other hand, if the value of the null_packet field is '1', the receiving apparatus 200, a client side may insert a null packet to the corresponding position of received data to restore an MPEG-2 TS because a corresponding media packet is a null packet in the media.

Meanwhile, 'entry_count' may represent the number of entries that are present in the following loop.

A media data format according to an embodiment of the present invention as described above with reference to FIGS. 5 to 11 may be used for transporting media transport streams to the receiving apparatus 200 through the network interface unit 120.

In this case, the transmitting apparatus 100 may transport media data that includes an mdat box including an MPEG-2 TS from which unnecessary data has been removed and a compression information (cinf) box including information for reinserting the removed data, to the receiving apparatus 200 by using an IP based transport system to decrease the bit rate of a media transport stream and simultaneously increase compatibility with an ISO base media file format.

According to another embodiment of the present invention, the MPEG-2 TS converted into a media data format as described with reference to FIGS. 5 to 11 may be stored in the storing unit 130 of the transmitting apparatus 100, and a smaller space for store a media file may thus be consumed.

Meanwhile, the media data stored in the storing unit 130 may then be transported through the network interface unit 120.

Figure 12:
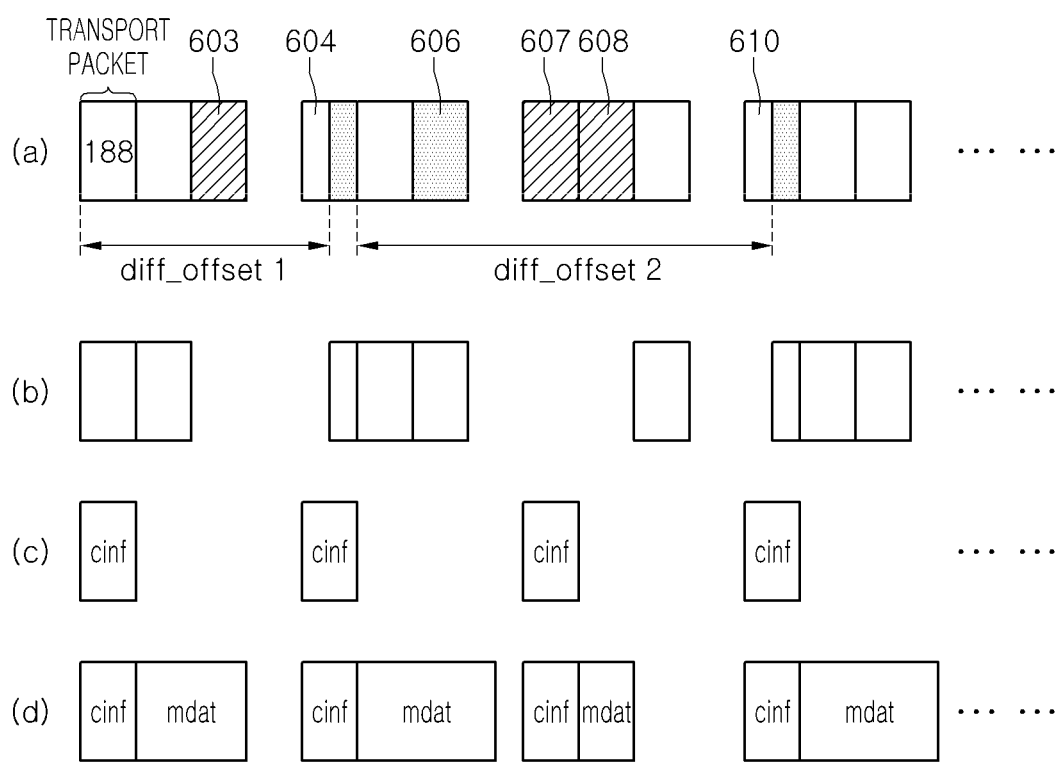
FIG. 12 is a view representing an embodiment of a method of forming a media data format.

FIG. 12 illustrates an embodiment of a method of configuring a media data format and represents a method of configuring media data with a format as described with reference to FIGS. 5 to 11.

Referring to FIG. 12, MPEG-2 TS packets each have a fixed bit rate of 188 bytes, and may be transported segment by segment, including one or more packets (for example, three MPEG-2 TS packets)

Since a third packet 603 of the MPEG-2 TS packets illustrated in FIG. 12A that has been included in a first segment is a null packet, the transmitting apparatus 100 may remove the third packet 603 from the MPET-2 TS as illustrated in FIG. 12B.

In addition, since a fourth packet 604 included in a second segment includes stuffing bytes and a sixth packet 606 includes a sync byte, the transmitting apparatus 100 may remove the stuffing bytes from the fourth packet 604 of the MPE-2 TS and the sync byte from the sixth packet 606 as illustrated in FIG. 12B.

Meanwhile, since a seventh packet 607 and an eighth packet 608 that are included in a third segment are null packets, the transmitting apparatus 100 may remove the seventh packet 607 and eighth packet 608 from the MPEG-2 TS as illustrated in FIG. 12B.

In addition, since a tenth packet 610 included in a fourth segment includes stuffing bytes, the transmitting apparatus 100 may remove the stuffing bytes from the tenth packet 610 of the MPEG-2 TS as illustrated in FIG. 12B.

Meanwhile, each of the MEGP-2 TSs from which the unnecessary data has been removed may be included in an mdat box segment by segment.

As illustrated in FIG. 12C, the transmitting apparatus 100 may configure compression information (cinf) boxes by using information for reinserting the removed data as described above, and the compression information (cinf) box may include one or more compression entry boxes (combs) and null packet signal boxes (npsbs).

In the case illustrated in FIG. 12, a first compression information (cinf) box may include information representing that the third packet 603 is a null packet, and the null_packet of an entry corresponding to the third packet 603 of entries of the null packet signal box (npsb) that has been included in the first compression information (cinf) box may have a field value of '1', for example.

In addition, a second compression information (cinf) box may provide information representing that the fourth packet 604 includes stuffing bytes and the sixth packet 606 includes a sync byte.

For example, the compression entry box (comb) included in the second compression information (cinf) box may include the differential byte offset of the position of stuffing bytes present in the fourth packet 604, namely the offset value (diff_offset 1) from the first byte of media to the stuffing bytes, as diff_offset.

In addition, sync_byte_removed have a value of 0x000001 to represent that the compression entry box (comb) included in the second compression information (cinf) box includes a sync byte.

In this case, the sync_byte_removed in all the compression entry boxes (combs) included in the second compression information (cinf) box has a flag value of 0x000001.

Meanwhile, a third compression information (cinf) box may provide information representing that the seventh packet 607 and eighth packet 608 are null packets and to that end, the null_packet of each of entries corresponding to the seventh packet 607 and eighth packet 608 of entries of the null packet signal box (npsb) that has been included in the third compression information (cinf) box may have a field value of '1'.

In addition, a fourth compression information (cinf) box may provide information representing that the tenth packet 610 includes stuffing bytes and to that end, the compression entry box (comb) included in the fourth compression information (cinf) box may include the differential byte offset value diff_offset 2 of the position of a stuffing byte present in the tenth packet 610.

In this case, the differential byte offset value diff_offset 2 may correspond to the offset value from the last byte of previously inserted stuffing bytes to a corresponding stuffing byte as illustrated in FIG. 12A.

Then, as illustrated in FIG. 12D, the transmitting apparatus 100 may configure a media data format in which the configured compression information (cinf) boxes are respectively attached and transported to the front of corresponding mdat boxes.

FIG. 13 illustrates an embodiment of a configuration of a media data stream transported from a transmitting apparatus.

Referring to FIG. 13, compression information for an MPEG-2 TS file segment, namely information for reinserting the data removed from the MPEG-2 TS file segment may be attached to the front of a corresponding segment.

For example, if the compression information is attached in a binary format, the MPEG-2 TS data from which unnecessary data has been removed as described above may be encapsulated into an mdat box segment by segment or by byte range for easy access and division.

As illustrated in FIG. 13, a media data stream 500 may start with a segment type (styp) box, a compression information (cinf) box and one or more compression entry boxes (combs) included therein may be added to the start portion, and then a null packet signal box (npsb) may be present.

The segment type (styp) box may have the same syntax structure as a file type (ftyp) box defined in an ISO/IEC 14496-12 ISO base media file format, except that its box type is set as 'styp', it has a brand of 'etsf', and its minor_version is set to '1'.

Meanwhile, the order of the compression entry boxes (combs) may play an important role in processing the receiving apparatus 200, a client side.

By the operation of the receiving apparatus 200 as described above, a null packet may be simplified to approximately 7-bit compressed information, and after removing a sync byte, it may need to transport only one next byte.

The size of the smallest string in a segment removed at a server side, namely transmitting apparatus 100 may depend on the smallest available size of a data type used to express the diff_offset of the compression entry box (comb) as described above.

For example, according to a test result, all signaling for the diff_offset may be performed in 16-bit data types.

Thus, there may be approximately 3-byte overhead to remove a string of repeated data and the transmitting apparatus 100, a server side may remove any string that is a size of 3 or bigger.

In this case, removing a string of the size of 3 just keeps the diff_offset small and may not assist directly in compression.

Embodiments of a method and apparatus for receiving media according to the present invention will be described in detail below with reference to FIGS. 14 to 16.

The receiving apparatus 200 according to an embodiment of the present invention may receive compression information for reinserting a media transport stream from which some data has been removed and the removed data from the transmitting apparatus 100 and may reinsert the removed data into the received media transport stream by using the compression information.

Figure 14:
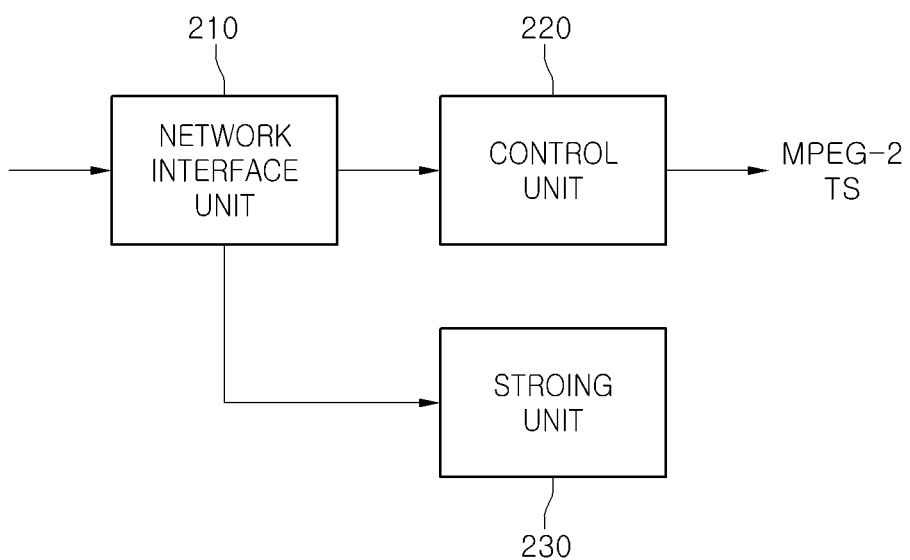
FIG. 14 is a block diagram representing a configuration of a receiving apparatus according to an embodiment of the present invention.

FIG. 14 illustrates a configuration of a receiving apparatus according to an embodiment of the present invention as a block diagram, and the illustrated receiving apparatus 200 may include a network interface unit 210, a control unit 220, and a storing unit 230.

Referring to FIG. 14, the network interface unit 210 may receive a transport stream with a data format as described above with reference to FIGS. 3 to 13 from the transmitting apparatus 100 through an IP based transport system.

For example, the network interface unit 210 may sequentially receive a compression information (cinf) box including at least one compression entry box (comb) and an mdat box including an MPEG-2 TS segment by segment from which some data has been removed, and the compression information (cinf) box may selectively include a null packet signal box (npsb).

The control unit 220 may acquire information for reinserting the removed data, from the compression information (cinf) box (or null packet signal box (npsb)) and reinsert the removed data into the MPEG-2 TS included in the mdat box by using the acquired information.

Meanwhile, the media transport stream received through the network interface unit 210 may be stored in the storing unit 130, and the stored media transport stream may then be output to the MPEG-2 TS after the removed data is reinserted through the control unit 220.

Figure 15:
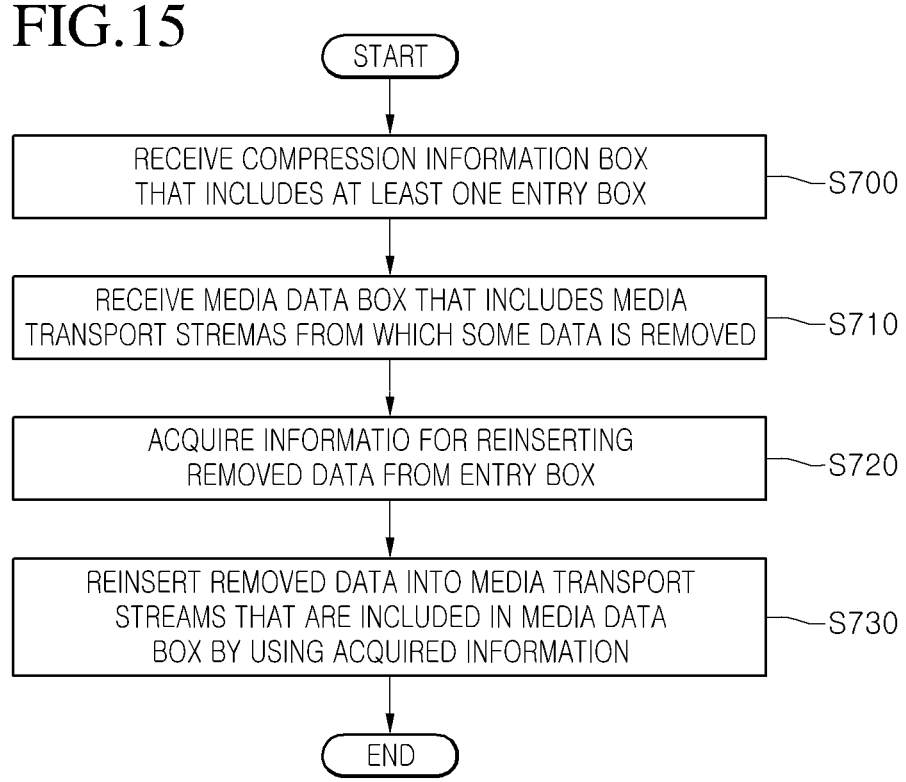
FIG. 15 is a flow chart representing a method of receiving media according to an embodiment of the present invention.

FIG. 15 illustrates a method of receiving media according to an embodiment of the present invention as a flow chart, and the illustrated receiving method will be described in connection with a blocking diagram that represents a configuration of a receiving apparatus according to an embodiment of the present invention illustrated in FIG. 14.

Referring to FIG. 15, the network interface unit 210 of the receiving apparatus 200 receives a compression information box including at least one entry box in step S700 and then receives an mdat box including a media transport stream from which some data has been removed, in step S710.

Since configurations of the received compression information (cinf) box and mdat box may be the same as those described with reference to FIGS. 3 to 13, their details descriptions will not be repeated.

Then, the control unit 330 acquires information for reinserting the removed data, from the entry box in step S720, and reinserts the removed data into the media transport stream included in the mdat box, by using the acquired information in step S730.

An embodiment of a method of reinserting data into the received media transport stream at the receiving apparatus 200 will be described in detail below with reference to FIG. 16.

Figure 16:
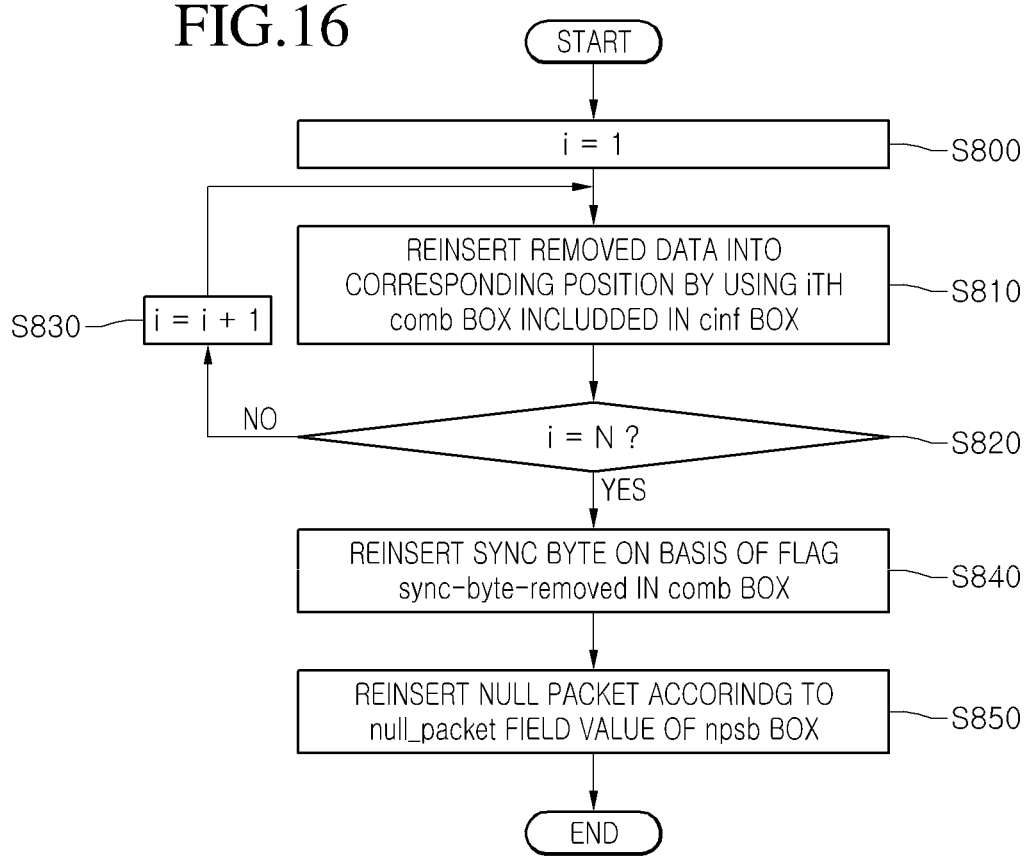
FIG. 16 illustrates an embodiment of a method of reinserting data into a received media stream as a flow chart.

Referring to FIG. 16, the control unit 220 reinserts the removed data into a corresponding position at the transmitting apparatus 100, by using a first compression entry box (comb) included in the compression information (cinf) box in steps S800 and S810.

For example, if repeated bytes such as stuffing bytes have been removed from an MPEG-2 TS included in an mdat box, the control unit 220 may identify the removed data, the position of the removed bytes and the number of times repeated by using reinset_data, diff_offset, and string_length included in the first compression entry box (comb).

Meanwhile, the control unit 220 may reinsert the removed bytes into the MPEG-2 TS included in the mdat box, according to the information identified by using the first compression entry box (comb).

The control unit 220 may successively perform the operation in step S810 described above for each of N compression entry boxes (combs) included in the compression information (cinf) box in steps S800 to S830 to reinsert all the bytes removed at the transmitting apparatus 100, such as stuffing bytes into the MPEG-2 TS included in the mdat box In addition, while steps S800 to S830 are performed, the control unit 220 may identify a flag sync_byte_removed at N compression entry boxes (combs) included in the compression information (cinf) box.

Meanwhile, all the compression entry boxes (combs) included in one compression information (cinf) box may have the same flag value.

Then, a sync byte is reinserted on the basis of a flag sync_byte_removed identified at the N compression entry boxes (combs) in step S840.

For example, if the sync_byte_removed in the N compression entry boxes (comb) included in the compression information (cinf) box has a flag of 0x000001, it is considered that a sync byte has been removed from a corresponding segment and the control unit 220 may thus reinsert the removed sync byte into the correct position of the MPEG-2 TS included in the mdat box.

After steps S800 to S840 have been performed, the control unit 220 reinserts a null packet according to the value of null_packet field designated by a null packet signal box (npsb) in step S850.

For example, if the value of the null_packet field of a specific one of entries included in the null packet signal box (npsb) is set to '1', the control unit 220 may identify that a packet corresponding to the specific entry is a null packet and may then reinsert the null packet into the position of the corresponding packet of the MPEG-2 TS included in the mdat box.

Figure 17:
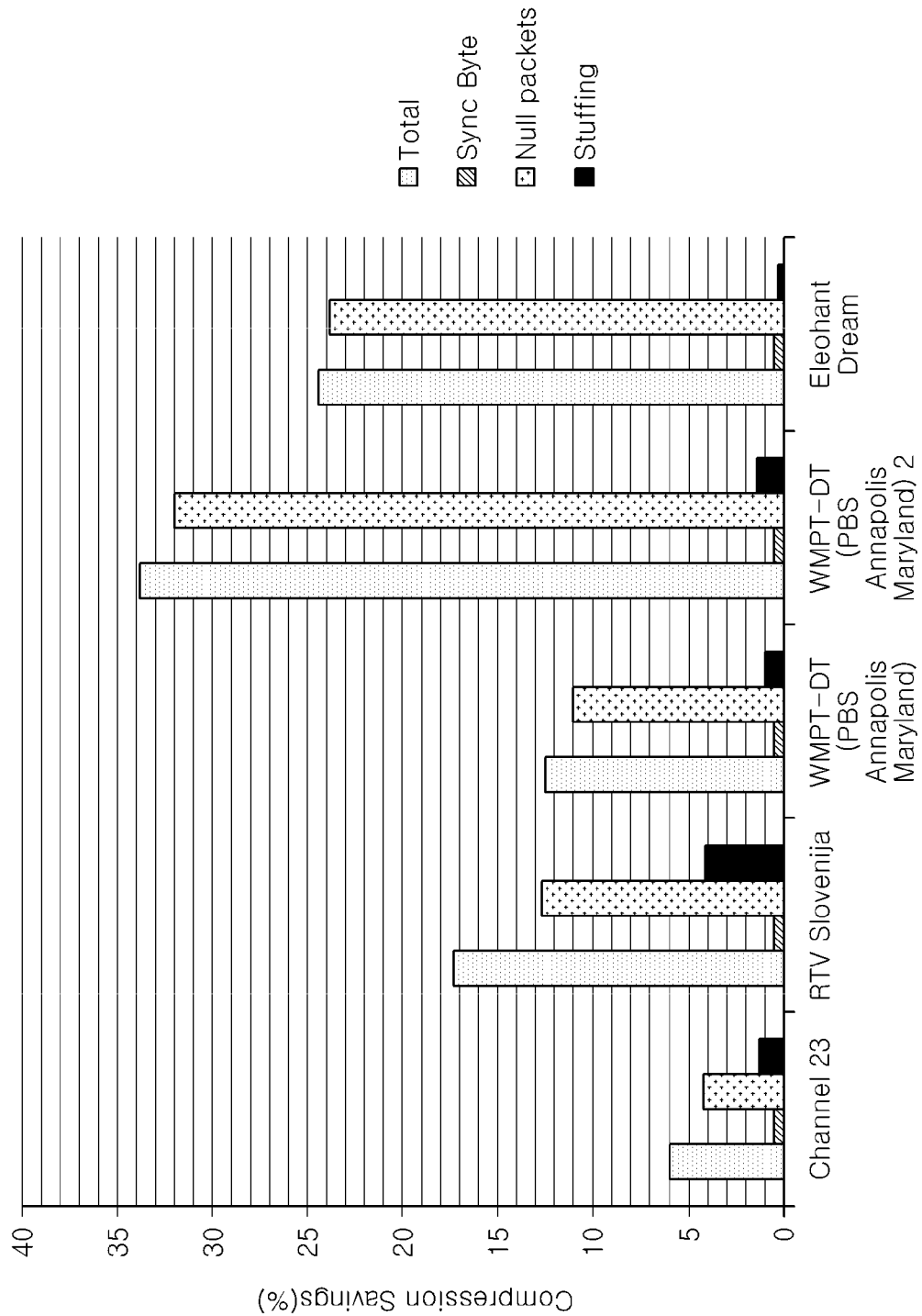
FIG. 17 is a graph for explaining an effect of a media transmitting/receiving system according to an embodiment of the present invention.

FIG. 17 illustrates a result of testing an effect of a media transmitting/receiving system according to an embodiment of the present invention, as a graph.

The test has been conducted on the following four exemplary contents.

1. Munich Channel 23 (capture internally, to be published). It is captured DVB transmission, duration approx. 3 minutes 10 seconds.

2. Content from RTV Slovenija, duration approx. 2 minutes 6 seconds.

3. Content from WMPT-DT (PBS Annapolis Md.), duration approx. 5 seconds.

4. Elephant Dream, segment 1.

Referring to FIG. 17, a decrease rate in data size due to compression may decrease in the order of removing null packets, stuffing bytes, and sync bytes.

The methods of receiving and processing IP based media as described with reference to FIGS. 1 to 17 may be performed by an IPTV receiver according to an embodiment of the present invention.

To that end, the IPTV receiver may receive the media transmitted from a transmitting side (for example, a media server) and may have a configuration as described with reference to FIGS. 5 to 13.

In addition, the IPTV receiver may reinsert the removed data to the media transport stream received from the transmitting side to replay or store it in an inner storage and the replayed or stored media may have a configuration such as an MPEG-2 TS format.

Meanwhile, the IPTV receiver may perform the media receiving method as described with reference to FIGS. 14 to 16.

A configuration of an IPTV receiver according to an embodiment of the present invention will be described in more detail below with reference to FIGS. 18 and 19.

Figure 18:
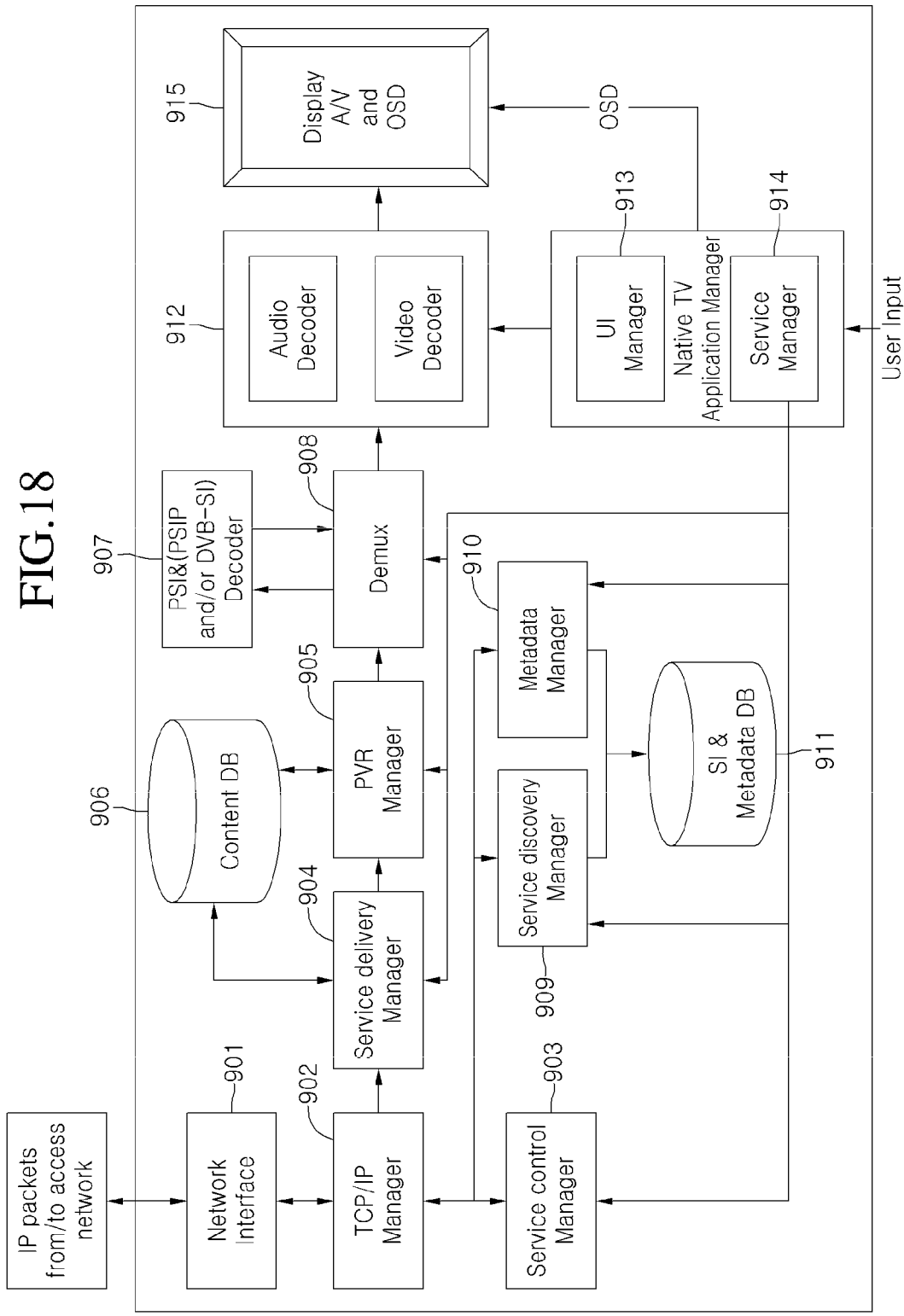
FIG. 18 is a block diagram representing a first embodiment of a configuration of an IPTV receiver according to the present invention.

FIG. 18 illustrates a configuration of an IPTV receiver according to an embodiment of the present invention, as a block diagram.

The IPTV receiver according to the embodiment of the present invention may include a separate tuner to be able to receive terrestrial broadcasting, cable broadcasting, satellite broadcasting, etc. For the convenience of description, the present invention describes on the basis of a configuration that receives IPTV services provided by an IP network.

Meanwhile, the acronym ITF indicates an open IPTV terminal function and may mean a receiver that includes functional modules required for supporting IPTV services.

The IPTV receiver may include a network interface unit 901, a TCP/IP manager 902, a service delivery manager 904, a PVR manager 905, a de-multiplexer 908, a data decoder 907, an audio/video decoder 912, an A/V display & OSD module 915, application manager 913 and 914, a service information (SI) metadata DB 911, a service discovery manager 909, a service control manager 903, a metadata manager 910, and a content DB 906.

Referring to FIG. 18, the network interface unit 901 receives and transports packets from/to a network. That is, the network interface unit 901 receives services and media contents from service providers through the network.

The TCP/IP manager 902 participates in delivering packets from sources to destinations that are received and transported by the IPTV receiver. In addition, the TCP/IP manager 902 classifies the received packets according to protocols and outputs the classified packets to the service delivery manager 904, service discovery manager 909, service control manager 903, and metadata manager 910.

The service delivery manager 904 is responsible for controlling the received service data. For example, if controlling real-time streaming data, RTP/RTCP may be used.

If the real-time streaming data is transported by using RTP, the service delivery manager 904 parses the received data packets according to RTP to transport them to the de-multiplexer 908 or store them in the content DB 906 according to the control of the service manager 914. In addition, the service delivery manager 904 feeds the information received from the network back to a service providing server side, by using RTCP.

The de-multiplexer 908 de-multiplexes the received packets to audio, video, program specific information (PSI) data, etc. and transports them to the audio/video decoder 912 and data decoder 907, respectively.

The data decoder 907 decodes service information, for example program specific information (PSI). That is, the data decoder 907 receives and decodes a de-multiplexed PSI section, program and service information protocol (PSIP) section, or DVB-service information (SI) section from the de-multiplexer 908.

In addition, the data decoder 907 decodes the received sections, and creates and stores a database on service information in the service information DB 911.

The audio/video decoder 912 decodes the video data and audio data received from the de-multiplexer 908. The audio and video data decoded from the audio/video decoder 912 is provided to users through the A/V display and OSD module 915.

The application manager manages the general conditions of the IPTV receiver, provides a user interface and manages the other managers. To that end, the application manager includes a user interface manager 913 and a service manager 914.

The user interface manager 913 provides a graphic user interface (GUI) for users by using an on screen display (OSD) and receives key input from users to perform the operations of the receiver according to the input. For example, if key input related to channel selection is received from users, the key input signal is transported to the service manager 914.

The service manager 914 controls managers associated with services, such as the service delivery manager 904, service discovery manager 909, service control manager 903, and metadata manager 910.

In addition, the service manager 914 creates a channel map and selects a channel by using the channel map according to the key input received from the user interface manager 913. In addition, the service manager 914 receives the service information of channels from the data decoder 907 and sets the audio/video packet identifier of the selected channel for the de-multiplexer 908.

The service discovery manager 909 provides information required for selecting a service provider that provides services. If a signal for channel selection is received from the service manager 914, the service discovery manager 909 searches for services by using the information.

The service control manager 903 is responsible for selecting and controlling services. For example, if a user selects a live broadcasting service such as a typical broadcasting technique, the service control manager 903 may select and control services by using IGMP or RTSP. If a user selects a video on demand (VOD) service, the service control manager may select and control services by using RTSP.

The RTSP protocol may provide a trick mode for real-time streaming. In addition, the service control manager 903 may initialize and manage sessions through an IMC gateway by using IP multimedia subsystem (IMS) and session initiation protocol (SIP). The protocols are examples and the other protocols may be used according to implementations.

The metadata manager 910 manages the metadata associated with services and stores the metadata in the service information DB 911.

The service information DB 911 stores service information that the data decoder 907 has decoded, metadata that the metadata manager 910 manages, and information that the service discovery manager 909 provides and is required for selecting a service provider. In addition, the service information DB 911 may store setup data on systems.

The service information DB 911 and content DB 906 each may be implemented by using a non-volatile RAM (NVRAM) or a flash memory and may be implemented as two logically divided regions on the same storing region.

The PVR manager 905 is a module for recording and replaying live streaming contents and may collect metadata on the recorded contents and create additional information to be provided to users, such as thumbnail images or an index.

The functions of the control unit of the IPTV receiver according to an embodiment of the present invention may be divided and implemented into a plurality of modules, such as the TCP/IP manager 902, service delivery manager 904, PVR manager 905, application manager 913 and 914, service discovery manager 909, service control manager 903, and metadata manager 910.

For example, the TCP/IP manager 902 may filter SD&S information by using target package information as described above and control so that the network interface unit 901 requests a server only payload or a segment corresponding to a specific package (for example, a package that the IPTV receiver has joined) and receives it.

Alternatively, the TCP/IP manager 902 may filter the SD&S information received in a multicast scheme by using the target package information so that only payload or a segment corresponding to a specific package is parsed and processed by the data decoder 907.

Figure 19:
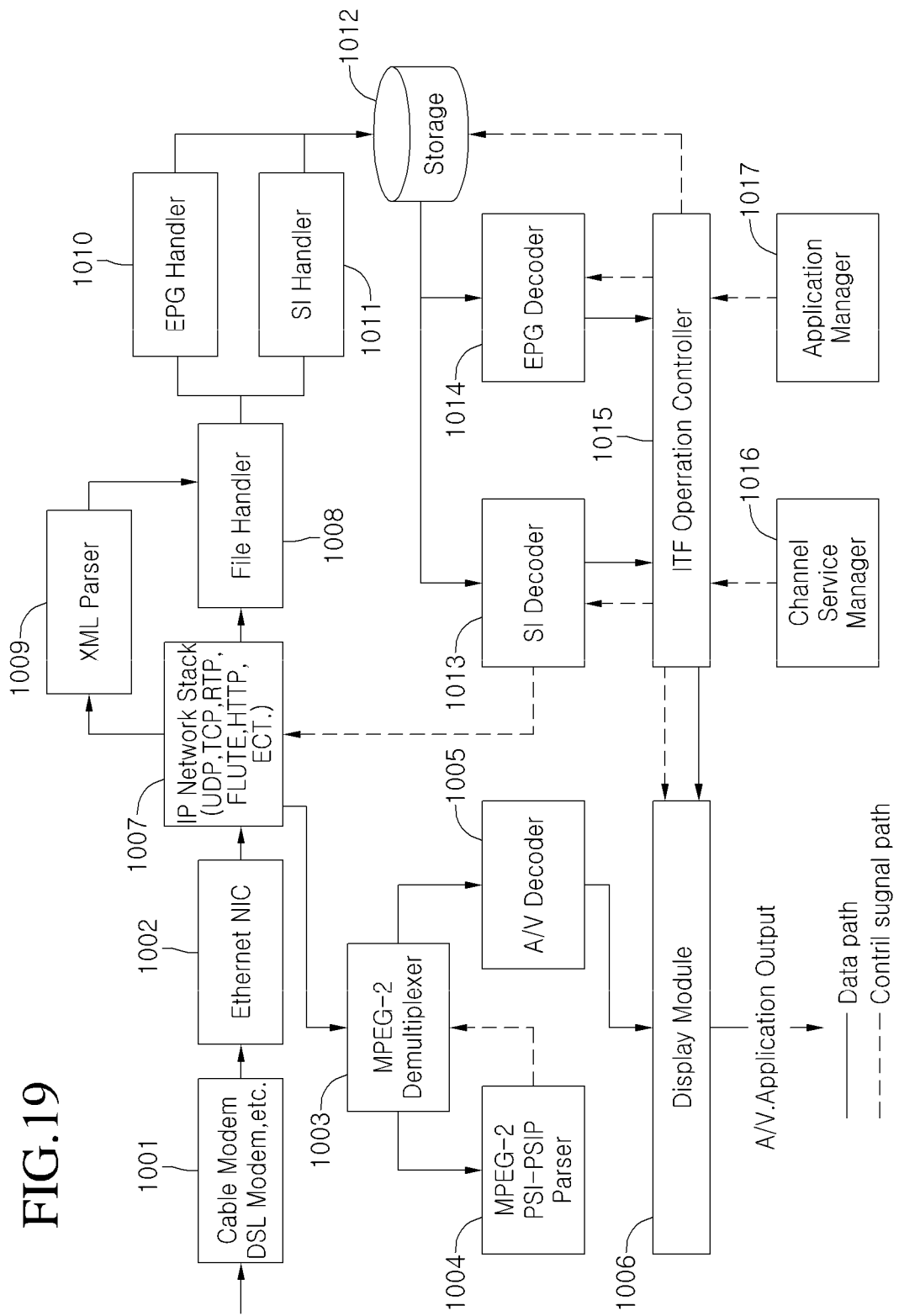
FIG. 19 is a block diagram representing a second embodiment of a configuration of an IPTV receiver according to the present invention.

FIG. 19 illustrates another embodiment of a configuration of an IPTV receiver according to the present invention as a block diagram and represents the functions of the IPTV receiver as functional blocks. The solid arrows illustrated in FIG. 19 correspond to data paths and the dotted arrows correspond to control signal paths.

Cable modem, DSL modem, etc. 1001 are interfaces for enabling ITF to be connected to the IP network and demodulate the signals transported through physical mediums to restore digital signals.

Ethernet NIC 1002 restores the signals received through the physical interface to IP data, and IP network stack 1007 processes each layer according to IP protocol stack.

Meanwhile, an XML parser 1009 parses XML documents among received IP data, and a file handler 1008 processes the data transported in a file type through FLUTE among the received IP data.

An SI handler 1011 processes a part corresponding to IPTV service information among the received file-type data and stores it in storage 1012, and an EPG handler 1010 may process a part corresponding to IPTV EPG information among the received file-type data and store it in the storage 1012.

The storage 1012 stores various data such as SI and EPG.

An SI decoder 1013 receives and analyzes SI data from the storage 1012 and acquires channel map information. An EPG decoder 1014 analyzes the EPG data stored in the storage 1012 and stores information required for configuring EPG.

An ITF operation controller 1015 is a main controller that controls the operations of the ITF, such as channel change or EPG display.

A channel service manager 1016 may perform operations, such as channel change according to user input and an application manager 1017 may perform application services, such as EPG display according to user input.

An MPEG-2 de-multiplexer 1003 may extract MPEG-2 transport stream data from received IP datagram and transport it to a corresponding module according to a packet identifier (PID).

In addition, an MPEG-2 PSI/PSIP parser 1004 may extract and parse PSI/PSIP data including the packet identifier of A/V data and connection information on a program element from the MPEG-2 transport stream.

Meanwhile, an A/V decoder 1005 decodes and delivers input audio and video data to a display module 1006, and the display module 1006 may output the decoded A/V data or application.

While methods and apparatuses for transmitting/receiving media according to embodiments have been described where a media transport stream transmitted/received between the transmitting apparatus 100 and receiving apparatus 200 is MPEG-2 TS, the present invention is not limited thereto but may be applied to various transport stream formats other than the MPEG-2 TS.

According to an embodiment of the present invention, in transmitting/receiving media transport streams such as MPEG-2 TS by using an IP based transport system, a media transport stream from which unnecessary data has been removed and information for reinserting the removed data are formed according to an ISO/IEC 14496-12 ISO base media file format and the bit rate of the media transport stream may thus be decreased and at the same, the compatibility with an ISO base media file format may be increased.

In addition, according to another embodiment, a media transport stream from which unnecessary data has been removed and information for reinserting the removed data are formed according to an ISO base media file format and stored in a media file and a smaller space for storing the media file may thus be consumed.

The media transmitting/receiving methods described above may be manufactured as a program for being executed on a computer and stored in a computer readable recording medium, and examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

In addition, although exemplary embodiments have been illustrated and described above, the present disclosure is not limited specific embodiments described above but may be varied by those skilled in the art without departing from the subject matter of the present disclosure claimed in the following claims. Further, these variations should not be understood individually from the technical spirit or perspective of the present disclosure.

What is claimed is:

1. A method of transmitting a media transport stream by using an IP based transport system, the method comprising:
   removing a first data and stuffing bytes from media transport stream to be transmitted;
   forming at least one entry box including information for reinserting the removed first data and the stuffing bytes into the media transport stream;
   forming a mdat box including the media transport stream from which the first data and the stuffing bytes are removed; and
   positioning a compression information box including the at least one entry box before the mdat box and transporting the compression information box and the mdat box,
   wherein the removing of the first data comprises removing sync bytes from the media transport stream,
   wherein the entry box includes first flag information that is signaled from the transport system and represents whether the sync bytes are removed,
   wherein, when the stuffing bytes include first stuffing bytes and second stuffing bytes, the entry box further includes a first offset value from a first byte of media transport stream to the first stuffing bytes, and a second offset value from a last byte of the first stuffing bytes to the second stuffing bytes.

2. The method of claim 1, wherein the entry box comprises at least one of first information representing repeated data, second information representing a position of the repeated data, and third information representing how many times data is repeated.

3. The method of claim 1, wherein the first flag information has the same value for all the entry boxes included in the compression information box.

4. The method of claim 1, wherein the removing further comprises removing null packets from the media transport stream.

5. The method of claim 4, wherein the compression information box further comprises a null packet signal box with information for reinserting the removed null packets into the media transport stream.

6. The method of claim 5, wherein the null packet signal box comprises a plurality of entries corresponding to a plurality of transport packets and each of the plurality of entries comprises first field information that represents whether the transport packet corresponding to the entry is a null packet.

7. The method of claim 1, further comprising storing a media file that includes the compression information box and mdat box.

8. A method of receiving a media transport stream from an IP based transport system, the method comprising:
sequentially receiving a compression information box that includes at least one entry box and an mdat box that includes media transport stream from which a first data and stuffing bytes are removed;
acquiring information for reinserting the removed first data and the stuffing bytes from the entry box; and
reinserting the removed first data and the stuffing bytes into the media transport stream that is included in the mdat box, by using the acquired information,
wherein the reinserting comprises:
identifying whether sync bytes are removed according to first flag information which is signaled from the transport system and is included in the entry box, and
reinserting the removed sync bytes into the media transport stream,
wherein, when the stuffing bytes include first stuffing bytes and second stuffing bytes, the entry box further includes a first offset value from a first byte of media transport stream to the first stuffing bytes, and a second offset value from a last byte of the first stuffing bytes to the second stuffing bytes.

9. The method of claim 8, wherein the reinserting of the removed first data comprises reinserting removed stuffing data into the media transport stream by sequentially using two or more entry boxes according to the received order that are included in the compression information box.

10. The method of claim 9, wherein the entry box comprises at least one of first information representing repeated data, second information representing a position of the repeated data, and third information representing how many times data is repeated.

11. The method of claim 8, wherein the compression information box further comprises a null packet signal box with information for reinserting the null packet removed from the media transport stream, and the null packet signal box comprises a plurality of entries corresponding to a plurality of transport packets, and each of the plurality of entries comprises first field information representing whether a transport packet corresponding to the entry is a null packet.

12. The method of claim 11, wherein the reinserting comprises:
identifying whether the null packet is removed, by using first field information that is included in the null packet signal box; and
reinserting the removed null packet into the media transport stream.

13. An apparatus for transmitting a media transport stream by using an IP based transport system, the apparatus comprising:

a controller that removes a first data and stuffing bytes from media transport stream to be transmitted and configures a compression information box that includes at least one entry box and a media data (mdat) box that includes media transport stream from which the first data and stuffing bytes are removed; and
a network interface that positions the compression information box before the mdat box and transports the compression information box and the mdat box,
and wherein the entry box includes information for reinserting the removed first data and stuffing bytes into the media transport stream,
wherein the controller removes sync bytes from the media transport stream,
wherein the entry box includes first flag information that is signaled from the transport system and represents whether the sync bytes are removed,
wherein, when the stuffing bytes include first stuffing bytes and second stuffing bytes, the entry box further includes a first offset value from a first byte of media transport stream to the first stuffing bytes, and a second offset value from a last byte of the first stuffing bytes to the second stuffing bytes.

14. The apparatus of claim 13, wherein the removed first data comprises at least one sync byte, and wherein the entry box comprises at least one of first information representing repeated data, second information representing a position of the repeated data, third information representing how many times data is repeated, and first flag information representing whether the sync byte is removed.

15. The apparatus of claim 13, further comprising a storing unit that stores a media file that includes the compression information box and mdat box.

16. An apparatus for receiving media transport stream from an IP based transport system, the apparatus comprising:
a network interface that sequentially receives a compression information box that includes at least one entry box and a media data (mdat) box that includes media transport stream from which a first data and stuffing bytes are removed; and
a controller that acquires information for reinserting the removed first data and the stuffing bytes, from the entry box and reinserting the removed first data and the stuffing bytes into media transport stream included in the mdat box, by using the acquired information,
wherein the controller identifies whether sync bytes are removed according to first flag information which is signaled from the transport system and is included in the entry box, and reinserts the removed sync bytes into the media transport stream,
wherein, when the stuffing bytes include first stuffing bytes and second stuffing bytes, the entry box further includes a first offset value from a first byte of media transport stream to the first stuffing bytes, and a second offset value from a last byte of the first stuffing bytes to the second stuffing bytes.

* * * * *